US012598381B2

(12) United States Patent
Sun et al.

(10) Patent No.: US 12,598,381 B2
(45) Date of Patent: Apr. 7, 2026

(54) QUICK PHOTOGRAPHING METHOD, ELECTRONIC DEVICE, AND COMPUTER-READABLE STORAGE MEDIUM

(71) Applicant: Huawei Technologies Co., Ltd., Shenzhen (CN)

(72) Inventors: Shenzhen Sun, Shanghai (CN); Lei Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 18/626,084

(22) Filed: Apr. 3, 2024

(65) Prior Publication Data

US 2024/0276097 A1      Aug. 15, 2024

Related U.S. Application Data

(63) Continuation of application No. PCT/CN2022/114536, filed on Aug. 24, 2022.

(30) Foreign Application Priority Data

Oct. 9, 2021     (CN) .......................... 202111180066.X

(51) Int. Cl.
H04N 23/67          (2023.01)
H04N 23/667        (2023.01)
(Continued)

(52) U.S. Cl.
CPC ............. *H04N 23/67* (2023.01); *H04N 23/71* (2023.01); *H04N 23/76* (2023.01); *H04N 23/80* (2023.01); *H04N 23/667* (2023.01)

(58) Field of Classification Search
CPC ...... H04N 23/667; H04N 23/67; H04N 23/71; H04N 23/76; H04N 23/80
See application file for complete search history.

(56) References Cited

U.S. PATENT DOCUMENTS

2019/0004282 A1*  1/2019  Park .......................... G02B 7/09
2019/0379812 A1*  12/2019  Suman ................. H04N 23/651
(Continued)

FOREIGN PATENT DOCUMENTS

CN         104618640 A       5/2015
CN         104994277 A      10/2015
(Continued)

*Primary Examiner* — Amy R Hsu
(74) *Attorney, Agent, or Firm* — Slater Matsil, LLP

(57)          ABSTRACT

This application is applicable to the field of terminal technologies, and in particular, relates to a photographing method, an electronic device, and a computer-readable storage medium. The electronic device includes a camera lens. The method includes: A camera application of the electronic device sends a photographing command to a hardware abstraction layer of the electronic device in response to a photographing operation. The hardware abstraction layer determines, based on a first image, a to-be-photographed image in response to the photographing command. The first image is an image that is captured by the camera lens and that is obtained by the hardware abstraction layer after the camera application is started. To be specific, when the camera application detects the photographing operation, the camera application does not detect a current focusing status, and does not wait for the HAL to report a focusing completion state.

20 Claims, 7 Drawing Sheets

(51) Int. Cl.
  *H04N 23/71*      (2023.01)
  *H04N 23/76*      (2023.01)
  *H04N 23/80*      (2023.01)

(56)                    References Cited

U.S. PATENT DOCUMENTS

| | | | |
|---|---|---|---|
| 2020/0366849 A1* | 11/2020 | Wu ...................... | H04N 23/667 |
| 2021/0243289 A1* | 8/2021 | Moon .................. | H04N 23/633 |
| 2022/0166933 A1* | 5/2022 | Agrawal ............. | G06F 3/04842 |

FOREIGN PATENT DOCUMENTS

| CN | 107155067 A | 9/2017 |
|---|---|---|
| CN | 107302666 A | 10/2017 |
| CN | 108833803 A | 11/2018 |
| CN | 110881104 A | 3/2020 |
| CN | 111447370 A | 7/2020 |

* cited by examiner (a)

(b)

QUICK PHOTOGRAPHING METHOD, ELECTRONIC DEVICE, AND COMPUTER-READABLE STORAGE MEDIUM

CROSS-REFERENCE TO RELATED APPLICATIONS

This application is a continuation of International Application No. PCT/CN2022/114536, filed on Aug. 24, 2022, which claims priority to Chinese Patent application Ser. No. 202111180066.X, filed on Oct. 9, 2021. The disclosures of the aforementioned applications are hereby incorporated by reference in their entireties.

TECHNICAL FIELD

This application relates to the field of terminal technologies, and in particular, relates to a quick photographing method, an electronic device, and a computer-readable storage medium.

BACKGROUND

In an existing photographing method, after detecting a photographing operation, a camera application needs to detect a current focusing status, and needs to wait for completed focusing. That is, a photographing command is sent to the HAL only after a command indicating successful focusing reported by a hardware abstraction layer (HAL) is received, to obtain a clear image based on the photographing command. However, a focusing process usually takes a long time, resulting in a slow photographing speed and affecting user experience.

SUMMARY

Embodiments of this application provide a quick photographing method, an electronic device, and a computer-readable storage medium, to improve photographing speed and user experience.

According to a first aspect, an embodiment of this application provides a quick photographing method, applied to an electronic device. The electronic device includes a camera lens, and the method may include the following.

A camera application of the electronic device sends a photographing command to a hardware abstraction layer of the electronic device in response to a photographing operation; and the hardware abstraction layer determines, based on a first image, a to-be-photographed image in response to the photographing command. The first image is an image that is captured by the camera lens and that is obtained by the hardware abstraction layer after the camera application is started.

In the quick photographing method, after the camera application of the electronic device is started, the HAL may obtain the first image captured by the camera lens. When the camera application detects the photographing operation, the camera application may directly send the photographing command to the HAL. After receiving the photographing command, the HAL may determine a final to-be-photographed image based on the photographing command and the first image. To be specific, in this embodiment of this application, when the camera application detects the photographing operation, the camera application does not detect a current focusing status, and does not wait for the HAL to report a focusing completion state. That is, regardless of whether a current preview image is clear, the camera application directly sends the photographing command to the HAL, and the HAL may directly determine the final to-be-photographed image based on the photographing command and the first image, to effectively reduce focusing time in a photographing process, and improve a photographing speed. This can achieve an objective of quickly taking snapshots, and improves user experience.

In a possible implementation, before the camera application sends the photographing command to the hardware abstraction layer, the method may further include:

The camera application sends a focus locking command to the hardware abstraction layer; and the hardware abstraction layer performs a focus locking operation in response to the focus locking command.

In the quick photographing method provided in this implementation, before sending the photographing command to the HAL, the camera application may further first send the focus locking command to the HAL. The HAL may perform focus locking based on the received focus locking command to end a focusing process, so that the camera lens may capture the stable and clear first image, and a clear to-be-photographed image may be obtained subsequently based on the first image. This can improve image photographing effect.

It may be understood that, in the quick photographing method provided in this implementation, after sending the focus locking command to the HAL, the camera application may send the photographing command to the HAL at an interval of preset time. For example, the preset time may be determined based on time required for the focus locking command to arrive at the HAL, time required for the photographing command to arrive at the HAL, and time required for the HAL to perform the focus locking operation.

Specifically, the photographing command includes a first moment, and the first moment is a moment at which the camera application detects the photographing operation; and that the hardware abstraction layer determines a to-be-photographed image based on a first image may include:

The hardware abstraction layer determines a second moment, and determines a preset image queue based on the first moment, the second moment, and the first image, where the second moment is a moment at which the hardware abstraction layer receives the photographing command; and the hardware abstraction layer determines the to-be-photographed image based on the preset image queue.

In the quick photographing method provided in this implementation, when detecting the photographing operation, the camera application may obtain the first moment, where the first moment may be a moment at which the camera application detects the photographing operation, and when sending the photographing command to the HAL, the camera application may carry the first moment in the photographing command; or when sending the focus locking command to the HAL, the camera application may carry the first moment in the focus locking command. When receiving the photographing command, the HAL may determine the second moment at which the photographing command is received, and may determine the preset image queue based on the first moment, the second moment, and the first image, to determine the final to-be-photographed image based on the preset image queue. This can improve definition of the to-be-photographed image and improve image photographing effect on a basis of ensuring a photographing speed.

In an example, that the hardware abstraction layer determines a preset image queue based on the first moment, the second moment, and the first image may include:

The hardware abstraction layer determines a second image that is in the first image and that is located between the first moment and the second moment, where the second image is at least one of the first images; and the hardware abstraction layer determines the second image as an image in the preset image queue.

In the quick photographing method provided in this implementation, the HAL may obtain, from the first images captured by the camera lens, R second images located between the first moment and the second moment, and may determine all the R second images as images in the preset image queue, where R≥1.

In another example, that the hardware abstraction layer determines a preset image queue based on the first moment, the second moment, and the first image may include:

The hardware abstraction layer determines a second image that is in the first image and that is located between the first moment and the second moment, where the second image is at least one of the first images; and the hardware abstraction layer obtains definition of the second image, and determines the preset image queue based on the definition of the second image.

In the quick photographing method provided in this implementation, after obtaining the R second images between the first moment and the second moment, the HAL may determine the definition of the second image, and may determine a preset image sequence based on the definition of the second image. To be specific, it is ensured that all images in the preset image sequence are images with high definition, so that when a target image is subsequently determined from the preset image sequence, a quantity of images to be compared can be effectively reduced. This can improve a speed of determining the target image, improve a photographing speed, and improve user experience.

For example, that the hardware abstraction layer determines the preset image queue based on the definition of the second image may include:

The hardware abstraction layer obtains a third image whose definition is greater than a preset definition threshold, and determines the third image as an image in the preset image queue, where the third image is at least one of the second images; or the hardware abstraction layer obtains N fourth images with highest definition from the second images, and determines the N fourth images as images in the preset image queue, where N≥1.

In the quick photographing method provided in this implementation, the HAL may determine the preset image sequence based on the definition of the second image and the preset definition threshold. Specifically, after determining the definition of the second image, the HAL may obtain the third image whose definition is greater than the preset definition threshold, that is, obtain, from the second image, the image whose definition is greater than the preset definition threshold, as the image in the preset image queue. A quantity S of third images is greater than or equal to 1. The preset definition threshold may be specifically set by skilled persons based on an actual situation, or may be set by the HAL by default. For example, the HAL may set the preset definition threshold by default based on the definition of the second image. For example, after determining the definition of the second image, the HAL may calculate average definition of the second image based on the definition of the second image, and may set the average definition to the preset definition threshold by default. For example, after determining the definition of the second image, the HAL may determine a moment at which the HAL completes the focus locking operation, and may set definition of the second image corresponding to the moment to the preset definition threshold by default.

Alternatively, after determining the definition of the second image, the HAL may obtain N fourth images with highest definition, and may determine the N fourth images as the images in the preset image sequence. N is an integer greater than or equal to 1, and a specific value of N may be specifically set by skilled persons based on an actual situation, or may be set by the HAL by default.

In another example, that the hardware abstraction layer determines a preset image queue based on the first moment, the second moment, and the first image may include:

The hardware abstraction layer determines a second image that is in the first image and that is located between the first moment and the second moment, where the second image is at least one of the first images; the hardware abstraction layer obtains a third moment at which a motor is started and a fourth moment at which the motor is in a stable state; the hardware abstraction layer obtains a fifth image that is in the second image and that is located between the third moment and the fourth moment; and the hardware abstraction layer determines the preset image queue based on the second image and the fifth image.

In the quick photographing method provided in this implementation, before completing the focus locking operation, the electronic device generally performs autofocus. In an autofocus process, the electronic device may push an ophthalmic lens by starting the motor. However, it usually takes a period of time for the motor to start to reach a stable state. In the period of time, the unstable movement of the motor causes a poor focusing status, resulting in a blurred image captured by the camera lens. In this embodiment of this application, the HAL may obtain the third moment at which the motor is started and the fourth moment at which the motor is in the stable state. Therefore, after obtaining the R second images, the HAL may determine the fifth image located between the third moment and the fourth moment, that is, determine which images in the second images are captured between the third moment and the fourth moment by the camera lens. Then, the HAL may determine an image other than the fifth image in the second image as an image in the preset image sequence, to ensure that all images in the preset image sequence are images with high definition, so that when the target image is subsequently determined from the preset image sequence, a quantity of images to be compared can be effectively reduced. This can improve a speed of determining the target image, improve a photographing speed, and improve user experience.

It should be understood that the HAL may alternatively delete the fifth image based on the third image or the fourth image, to obtain the preset image sequence. That is, after determining the third image or the fourth image based on the definition of the second image, the HAL may determine the fifth image located between the third moment and the fourth moment, that is, determine which images in the third image or the fourth image are captured between the third moment and the fourth moment by the camera lens. Then, the HAL may determine an image other than the fifth image in the third image or the fourth image as an image in the preset image sequence, to ensure definition of the image in the preset image sequence, improve a speed of determining the target image, and improve a photographing speed.

In a possible implementation, that the hardware abstraction layer determines the to-be-photographed image based on the preset image queue may include:

The hardware abstraction layer obtains a target image with highest definition in the preset image queue, and determines the target image as the to-be-photographed image; or the hardware abstraction layer obtains a target image with the highest definition that is closest to the first moment and that is in the preset image queue, and determines the target image as the to-be-photographed image.

In the quick photographing method provided in this implementation, the HAL may determine the target image with the highest definition in the preset image sequence as the final to-be-photographed image, to ensure definition of the to-be-photographed image, and improve image photographing effect. Alternatively, the HAL may determine, as the final to-be-photographed image, the target image with the highest definition that is closest to the first moment and that is in the preset image queue. The first moment is an actual photographing moment, that is, the first moment is a moment at which the user triggers photographing, to reduce a photographing delay, and improve image photographing effect.

In another possible implementation, that the hardware abstraction layer determines the to-be-photographed image based on the preset image queue may include:

The hardware abstraction layer obtains M target images with highest definition in the preset image queue, where M>1; and the hardware abstraction layer performs synthesis processing on the M target images, and determines a synthesized image as the to-be-photographed image; or the hardware abstraction layer obtains M target images with the highest definition that are closest to the first moment and that are in the preset image queue; and the hardware abstraction layer performs synthesis processing on the M target images, and determines a synthesized image as the to-be-photographed image.

In the quick photographing method provided in this implementation, the HAL may obtain the M target images with highest definition in the preset image sequence, perform synthesis processing on the M target images, and determine the synthesized image as the final to-be-photographed image. For example, the HAL may perform multi-frame noise reduction on the M target images, that is, the HAL may find, in different target images, a pixel with noise, and then perform weighted synthesis to replace the pixel with a pixel without noise at a same position in another target image, to obtain a clear and clean to-be-photographed image. This can improve image photographing effect.

It should be understood that a specific value of M may be set by skilled persons based on an actual situation, or may be set by the electronic device by default. For example, the electronic device may set M by default based on current ambient luminance.

In another possible implementation, that the hardware abstraction layer determines the to-be-photographed image based on the preset image queue may include:

The hardware abstraction layer obtains current ambient luminance, and determines the to-be-photographed image based on the ambient luminance and the preset image queue.

For example, that the hardware abstraction layer determines the to-be-photographed image based on the ambient luminance and the preset image queue may include:

When the ambient luminance is greater than a preset luminance threshold, the hardware abstraction layer obtains a target image with highest definition in the preset image queue, and determines the target image as the to-be-photographed image.

When the ambient luminance is less than or equal to the preset luminance threshold, the hardware abstraction layer obtains M target images with highest definition in the preset image queue, where M>1; and the hardware abstraction layer performs synthesis processing on the M target images, and determines a synthesized image as the to-be-photographed image.

In the quick photographing method provided in this implementation, after the camera application is started, the electronic device may obtain current ambient luminance, so that the HAL can determine the final to-be-photographed image based on the current ambient luminance. For example, when the current ambient luminance is low luminance, the HAL may obtain M target images, and may determine an image obtained after the M target images are synthesized as the final to-be-photographed image, that is, the HAL may obtain the M target images with highest definition in the preset image queue, and may perform multi-frame noise reduction on the M target images to obtain the final to-be-photographed image, to improve image photographing effect in a dark environment. When the current ambient luminance is medium and high luminance, the HAL may directly determine a single-frame target image as the final to-be-photographed image. That is, the HAL may obtain a target image with highest definition in the preset image queue, and may determine the target image as the final to-be-photographed image, to improve a photographing speed.

It should be understood that the low luminance and the medium and high luminance may be determined based on a preset luminance threshold. That is, when the ambient luminance is less than or equal to the preset luminance threshold, it may be determined that the ambient luminance is low luminance; or when the ambient luminance is greater than the preset luminance threshold, it may be determined that the ambient luminance is medium and high luminance. The preset luminance threshold may be specifically determined by skilled persons based on an actual situation.

In a possible implementation, the quick photographing method provided in this embodiment of this application may be an optional mode (for example, a snapshot mode) of a camera application. A user may determine, based on an actual requirement, whether to enable the snapshot mode to perform photographing. To be specific, when the user selects the snapshot mode, the electronic device may perform photographing according to the quick photographing method provided in this embodiment of this application. When the user does not select the snapshot mode, the electronic device performs photographing according to a common photographing method.

In another possible implementation, the quick photographing method provided in this embodiment of this application may alternatively be directly integrated into a photo mode of the camera application. To be specific, after the camera application is started, the electronic device may determine whether the camera application has a quick photographing function. If it is determined that the camera application has the quick photographing function, the electronic device may directly perform photographing according to the quick photographing method provided in this embodiment of this application.

In another possible implementation, the quick photographing method provided in this embodiment of this application may alternatively have a photographing function that is applicable only to a preset application scenario (for example, a snapshot scenario). Specifically, after the camera application is started, the electronic device may determine whether a current photographing scenario is a snapshot scenario. When determining that the current photographing scenario is the snapshot scenario, the electronic device may perform quick photographing according to the quick photographing method provided in this embodiment of this application, to meet a snapshot requirement of the user, and improve user experience; or when determining that the current photographing scenario is not the snapshot scenario, the electronic device may perform photographing based on the common photographing method.

For example, the electronic device may determine, based on start time and a start manner of the camera application, whether the current photographing scenario is the snapshot scenario. Specifically, in a process in which the electronic device displays a first application, when detecting that the camera application is started by using a shortcut icon, the electronic device may determine that the current photographing scenario is the snapshot scenario. The first application is any application other than the camera application in the electronic device.

For example, the electronic device may also directly determine, in a manner of starting the camera application, whether the current photographing scenario is the snapshot scenario. Specifically, a preset starting manner corresponding to the snapshot scenario may be preset in the electronic device. When starting the camera application, the electronic device may determine a current starting manner. If the current starting manner is the preset starting manner, the electronic device may determine that the current photographing scenario is the snapshot scenario.

According to a second aspect, an embodiment of this application provides an electronic device, including a memory, a processor, and a computer program that is stored in the memory and that can be run on the processor. When the computer program is executed by the processor, the electronic device is enabled to implement the quick photographing method according to any one of the implementations of the first aspect.

According to a third aspect, an embodiment of this application provides a computer-readable storage medium. The computer-readable storage medium stores a computer program. When the computer program is executed by a computer, the computer is enabled to implement the quick photographing method according to any one of the implementations of the first aspect.

According to a fourth aspect, an embodiment of this application provides a computer program product. When the computer program product runs on an electronic device, the electronic device performs the quick photographing method according to any one of the implementations of the first aspect.

It may be understood that, for beneficial effect of the second aspect to the fourth aspect, reference may be made to related descriptions in the first aspect. Details are not described herein again.

DETAILED DESCRIPTION OF ILLUSTRATIVE EMBODIMENTS

Figure 1:
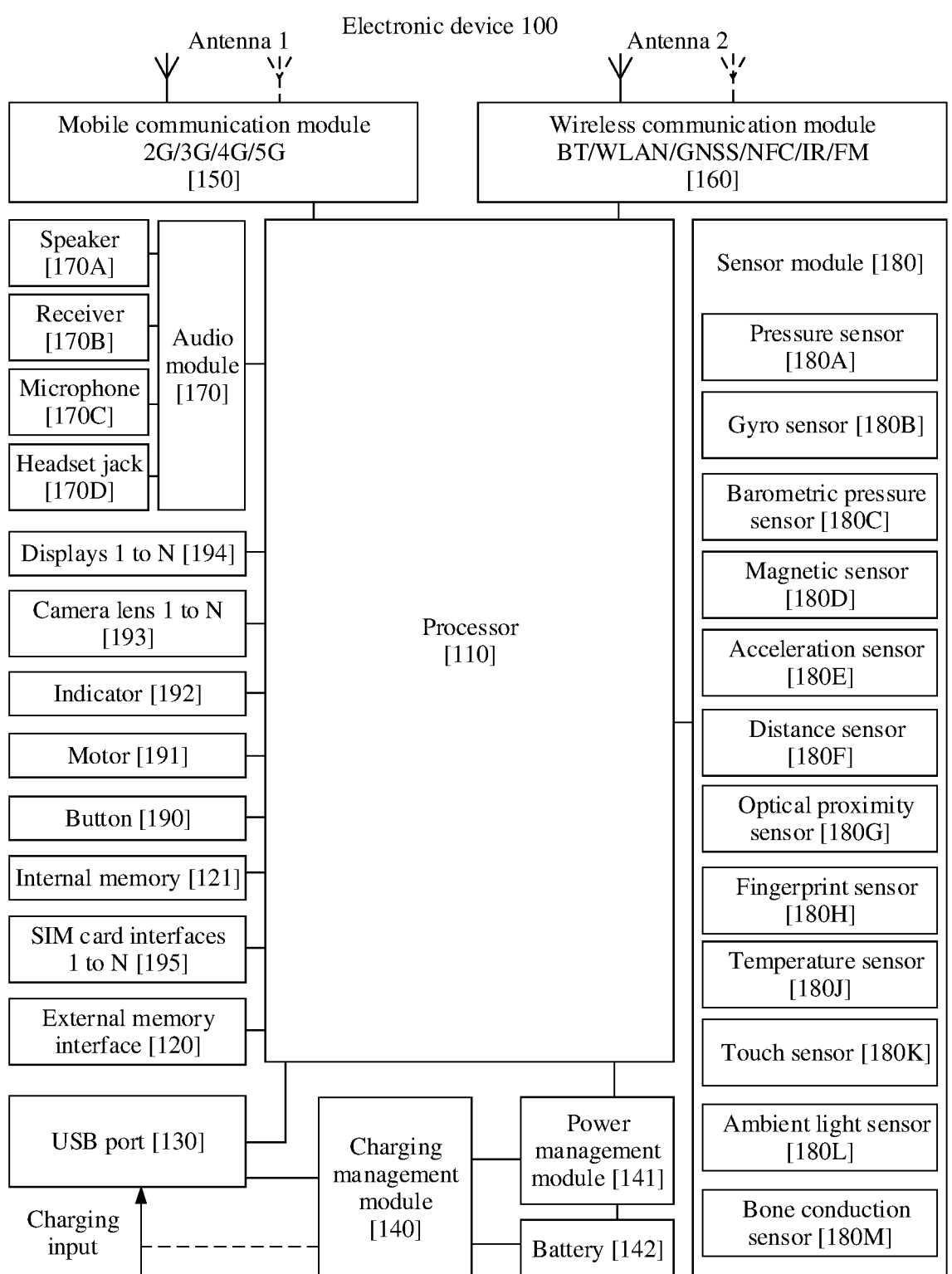
FIG. 1 is a schematic diagram of a structure of an electronic device to which a quick photographing method is applicable according to an embodiment of this application.

It should be understood that, when used in the specification and the appended claims of this application, the term "include" indicates presence of the described features, entireties, steps, operations, elements, and/or assemblies, but does not exclude presence or addition of one or more other features, entireties, steps, operations, elements, assemblies, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims of this application, the terms "first", "second", "third", and the like are only intended for a purpose of differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to embodiments. Therefore, in this specification, statements such as "in an embodiment", "in some embodiments", "in some other embodiments", and "in other embodiments", that appear at different places do not necessarily mean reference to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

In addition, "a plurality of" mentioned in embodiments of this application should be explained as two or more.

Steps in a quick photographing method provided in embodiments of this application are only examples. Not all steps are mandatory, or not all content in each piece of information or each message is mandatory. The steps or the content may be added or reduced as required in a use process. A same step, or a step or a message having a same function in embodiments of this application may be mutually referenced in different embodiments.

Service scenarios described in embodiments of this application are intended to describe the technical solutions provided in embodiments of this application more clearly, but are not intended to limit the technical solutions provided in embodiments of this application. Persons of ordinary skill in the art may learn that with evolution of network architectures and emergence of a new service scenario, the technical solutions provided in embodiments of this application are also applicable to a similar technical problem.

In a general photographing method, after a camera application detects a photographing operation, a camera application needs to detect a current focusing status, and needs to wait for completed focusing. That is, after receiving a command indicating successful focusing reported by an HAL, the camera application sends a photographing command to the HAL, to obtain a clear image based on the photographing command. An electronic device generally integrates an autofocus sensor and a pixel sensor. Focusing is to take out a pair of pixels that are opposite to each other on the left and right sides and that are from the pixel sensor, separately detect information such as light admitted on an object in a scenario, and accurately find a focus by comparing correlation values of the pixels on the left and right sides. Then, a motor pushes an ophthalmic lens to a corresponding position at a time to complete focusing. That is, a focusing process generally takes a long time. As a result, a photographing speed is slow, and a photographing requirement of a user cannot be met. In particular, a photographing requirement corresponding to a case in which the user needs to quickly take snapshots cannot be met, and user experience is affected.

An embodiment of this application provides a quick photographing method. In the method, after the camera application of the electronic device is started, the HAL of the electronic device may start to obtain a first image captured by a camera lens. When the camera application detects the photographing operation, the camera application may directly send the photographing command to the HAL. After receiving the photographing command, the HAL may determine a final to-be-photographed image based on the photographing command and the first image. To be specific, in this embodiment of this application, when the camera application detects the photographing operation, the camera application does not detect a current focusing status, and does not wait for the HAL to report a focusing completion state. That is, regardless of whether a current preview image is clear, the camera application directly sends the photographing command to the HAL, and the HAL may directly determine the final to-be-photographed image based on the photographing command, to effectively reduce focusing time in a photographing process, and improve a photographing speed. This can achieve an objective of quickly taking snapshots, and improves user experience, and have strong usability and practicability.

The quick photographing method provided in embodiments of this application is applied to an electronic device with a photographing function, such as a mobile phone, a tablet computer, or a wearable device. A specific type of the electronic device is not limited in embodiments of this application. The mobile phone may be a mobile phone with a foldable display. It may be understood that, when the mobile phone is in a folded state, the foldable display may include a primary display and a secondary display. The primary display may be disposed on one side of the mobile phone, and the secondary display may be disposed on the other side of the mobile phone. The primary display is a main display apparatus and is the most used screen, while the secondary display is an auxiliary screen and is less used.

The following first describes an electronic device in embodiments of this application. FIG. 1 is a schematic diagram of a structure of an electronic device 100.

As shown in FIG. 1, the electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera lens 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors.

The controller may generate an operation control signal based on instruction operation code and a time sequence signal, to complete control of instruction fetching and instruction execution.

A memory may be disposed in the processor 110, and is configured to store instructions and data. In some embodiments, the memory in the processor 110 is a cache memory. The memory may store instructions or data that just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera lens 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral device such as the display 194 or the camera lens 193. The MIPI interface includes a camera serial interface (CSI), a display serial interface (DSI), and the like. In some embodiments, the processor 110 communicates with the camera lens 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera lens 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB type-C interface, or the like. The USB port 130 may be configured to connect to a charger to charge the electronic device 100, or may be configured to transmit data between the electronic device 100 and a peripheral device, or may be configured to connect to a headset for playing audio through the headset. The interface may be configured to connect to another electronic device such as an AR device.

It may be understood that an interface connection relationship between the modules shown in this embodiment of this application is only an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera lens 193, the wireless communication module 160, and the like. The power management module 141 may be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more devices integrating at least one communication processor module. The wireless communication module 160 receives an electromagnetic wave by the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

In some embodiments, when the display panel is made of a material such as an OLED, an AMOLED, or an FLED, the display can be bent. That the display may be bent means that the display may be bent to any angle at any part along any axis, and may be maintained at the angle. For example, the display may be folded from left and right in the middle, or may be folded from top and bottom in the middle. In this embodiment of this application, the display that can be folded is referred to as a foldable display. The foldable display may include one screen, or may be a display formed by combining a plurality of screens. This is not limited herein. The display may also be a flexible display, and may be strongly flexible and bendable, and may provide a user with a new interaction mode based on the bendable feature, and meet more requirements of the user for a mobile phone with a foldable display. For an electronic device configured with a foldable display, the foldable display on the electronic device may be switched between a small display in a folded state and a large display in an unfolded state at any time.

The electronic device 100 may implement a photographing function by using the ISP, the camera lens 193, the video codec, the GPU, the display 194, the application processor and the like.

The ISP is configured to process data fed back by the camera lens 193. For example, during photographing, a shutter is pressed, and light is transmitted to a photosensitive element of the camera lens through a lens. An optical signal is converted into an electrical signal, and the photosensitive element of the camera lens transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera lens 193.

The camera lens 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N camera lenses 193, and N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. Therefore, the electronic device 100 may play or record videos in a plurality of coding formats, for example, moving picture experts group (MPEG) 1, MPEG 2, MPEG 3, and MPEG 4.

The NPU is a neural-network (NN) computing processor, quickly processes input information with reference to a structure of a biological neural network, for example, with reference to a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data, and a phone book) created in a process of using the electronic device 100, and the like. In addition, the internal memory 121 may include a high-speed random access memory, or may include a nonvolatile memory, for example, at least one magnetic disk storage device, a flash memory, or a universal flash storage (UFS). The processor 110 runs the instructions stored in the internal memory 121 and/or the instructions stored in the memory disposed in the processor, to perform various function applications of the electronic device 100 and data processing.

The electronic device 100 may implement audio functions such as music playing and recording functions by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal, implement noise reduction, and identify a sound source, implement a directional recording function, and the like.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may also be used in a navigation scenario and a motion-sensing game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover by using the magnetic sensor 180D, to set a feature such as automatic unlocking through flipping based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used for automatically unlocking or locking a screen in leather case mode or pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch control device". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in a headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effect. The motor 191 may also correspond to different vibration feedback effect for touch operations performed on different areas of the display 194. Different application scenarios (for example, a time reminder, information receiving, an alarm clock, and a game) may also correspond to different vibration feedback effect. The touch vibration feedback effect may be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external memory card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of this application, an Android system with a layered architecture is used as an example to describe a software structure of the electronic device 100.

Figure 2:
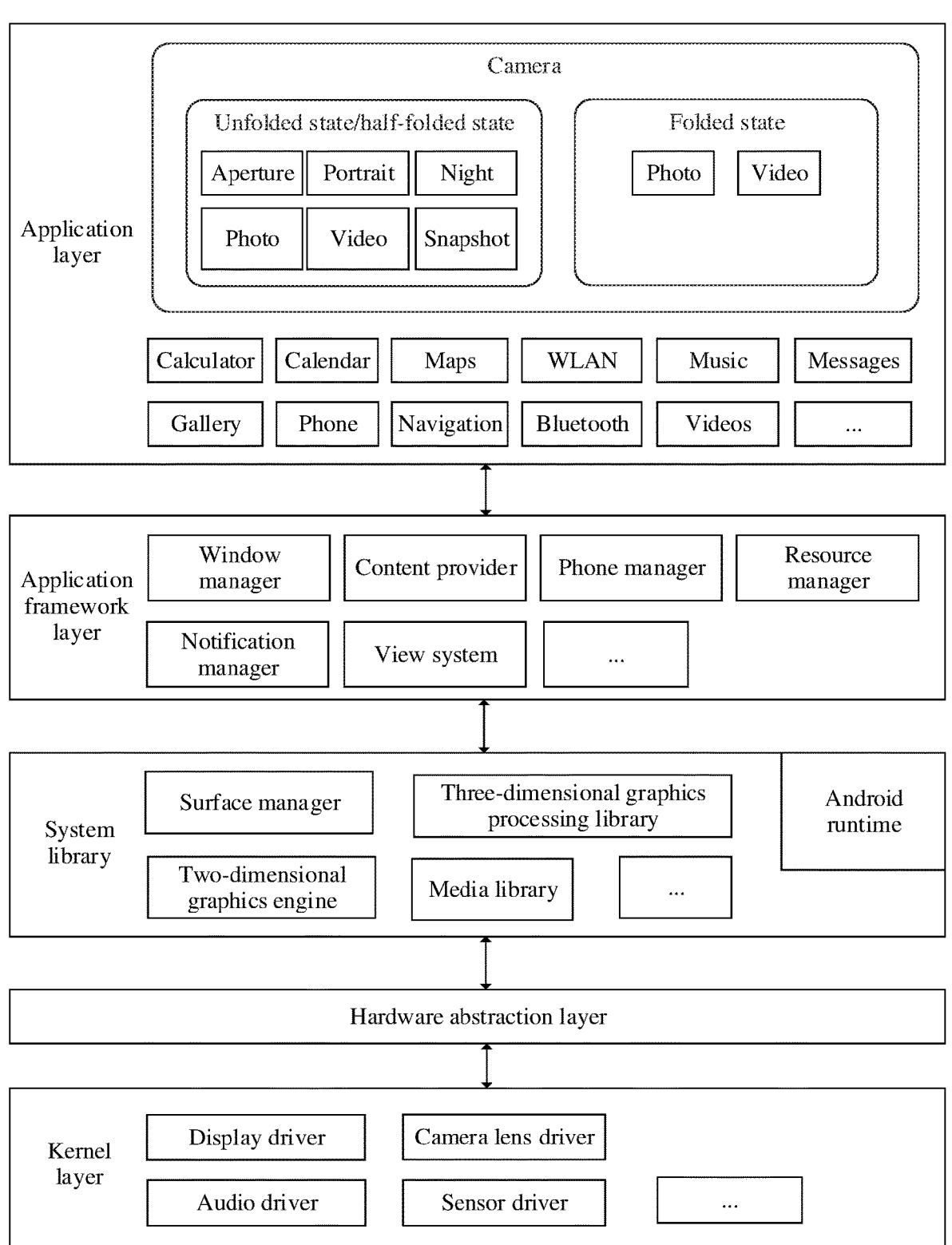
FIG. 2 is a schematic diagram of a software architecture to which a quick photographing method is applicable according to an embodiment of this application.

FIG. 2 is a block diagram of a software structure of the electronic device 100 according to an embodiment of this application.

In a layered architecture, software is divided into several layers, and each layer has a clear role and task. The layers communicate with each other through a software interface. In some embodiments, an Android system is divided into an application layer, an application framework layer, an Android runtime and system library, a hardware abstract layer (HAL), and a kernel layer from top to bottom.

The application layer may include a series of application packages.

As shown in FIG. 2, the application packages may include applications such as Camera, Calculator, Gallery, Calendar, Phone, Maps, Navigation, WLAN, Bluetooth, Music, Videos, and Messages.

In this embodiment of this application, when the camera application is applicable to an electronic device with a foldable display, when developing the camera application, a developer may add, to a camera application package by using a plug-in technology, a secondary display camera application in a folded state, that is, the camera application may include a primary display camera application in an unfolded state or a half-folded state, and the secondary display camera application in a folded state. The primary display camera application may include an aperture mode, a portrait mode, a night mode, a photo mode, a video mode, a snapshot mode, and the like. The secondary display camera application may include a photo mode, a video mode, and the like. In an example, the photo mode of the secondary display camera application may directly integrate a quick photographing function, that is, the user may directly enable the photo mode of the secondary display camera application to quickly take snapshots.

It should be understood that, when the electronic device is in a folded state, the user may use the secondary display camera application to perform photographing. Specifically, the user may invoke the secondary display camera application by sliding leftward or rightward on the secondary display, and may exit the secondary display camera application by sliding rightward or leftward, or may switch a mode of the secondary display camera application by sliding upward or downward. In the secondary display camera application, the user may also perform photographing or record a video by tapping a preview, or may perform photographing or record a video by using a preset gesture operation, or a voice including a preset keyword, or touching a volume down button, or the like. An image or a video photographed by using the secondary display camera application may be viewed from Gallery, or may be viewed by tapping a thumbnail of the secondary display camera application or the primary display camera application.

It should be noted that, when the electronic device is in an unfolded state or a half-folded state, the secondary display camera application may be hidden. In this case, the user may use the primary display camera application to perform photographing.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history, a bookmark, an address book, and the like.

The view system includes visual controls such as a control for displaying a text and a control for displaying an image. The view system may be configured to construct an application. A display interface may include one or more views. For example, a display interface including a notification icon of Messages may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, a prompt tone is produced, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The HAL and the kernel layer are layers between hardware and software. The HAL encapsulates a driver at the kernel layer and provides interfaces upward, to shield implementation details at a bottom layer. The kernel layer includes at least a display driver, a camera lens driver, an audio driver, and a sensor driver. That is, the Android system divides hardware support into two layers: one layer is in user space, and the other layer is in kernel space. The HAL runs in the user space, and the kernel driver runs in the kernel space.

The following describes an example of a working procedure of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the original input event. For example, the touch operation is a single-tap touch operation and a control corresponding to the single-tap operation is a control of a camera application icon. A camera application invokes an interface at the application framework layer, so that the camera application is started. Then, a camera lens driver is started by invoking the kernel layer, and a static image or a video is captured through the camera lens 193.

Figure 3:
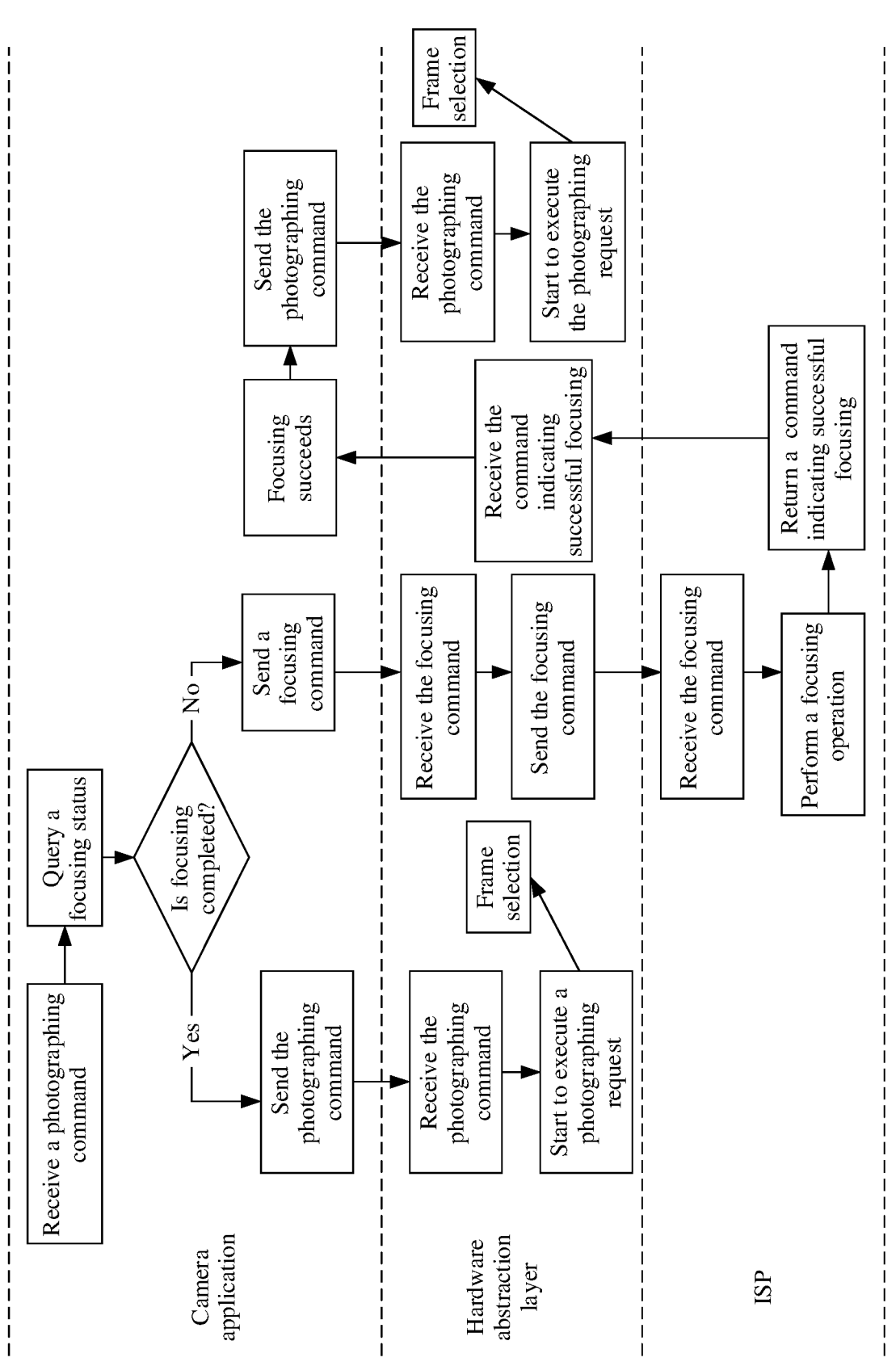
FIG. 3 is a schematic flowchart of a photographing method.

FIG. 3 is a schematic flowchart of a photographing method. A zero shutter lag (ZSL) photographing method is a technology used to reduce a photographing lag, to complete instantly photographing and echoing. Specifically, after starting previewing, an electronic device may obtain each frame of image captured by a camera lens, and separately store the obtained frames of images in an image queue buffer. After focusing succeeds, the electronic device deletes, from the buffer, images before the focusing succeeds, so that the image stored in the image sequence is an image after focusing succeeds. When photographing is triggered, the electronic device calculates an actual photographing moment, and finds, in the buffer, an image corresponding to the photographing moment as a current to-be-photographed image.

As shown in FIG. 3, when a camera application detects a photographing operation, the camera application needs to query a current focusing status to determine whether focusing is completed, that is, query whether an HAL reports a command indicating successful focusing to determine whether current focusing is completed. When it is determined that focusing is not completed, the camera application needs to send a focusing command to the HAL. After receiving the focusing command, the HAL may send the focusing command to an ISP. After receiving the focusing command, the ISP may push, by using a motor, the ophthalmic lens to perform focusing, and after focusing is completed, the ISP may return the command indicating successful focusing to the HAL. After receiving the command indicating successful focusing returned by the ISP, the HAL may send the command indicating successful focusing to the camera application. After receiving the command indicating successful focusing returned by the HAL, the camera application may determine that focusing is completed. In this case, the camera application may send the photographing command to the HAL. After receiving the photographing command, the HAL may start to execute a photographing request, for example, lock an image sequence (that is, stop adding a new image to the image sequence, and delete images before focusing succeeds), and apply for memory (used to store a finally obtained to-be-photographed image). Then, the HAL may perform ZSL frame selection, that is, obtain a frame of image (that is, an image corresponding to a photographing moment) in the image queue as a final to-be-photographed image. It may be understood that the photographing operation may be that a user taps, touches, or presses a photographing button, may be that a user performs a preset gesture, may be that a user inputs a voice including a preset keyword, or the like.

Figure 4:
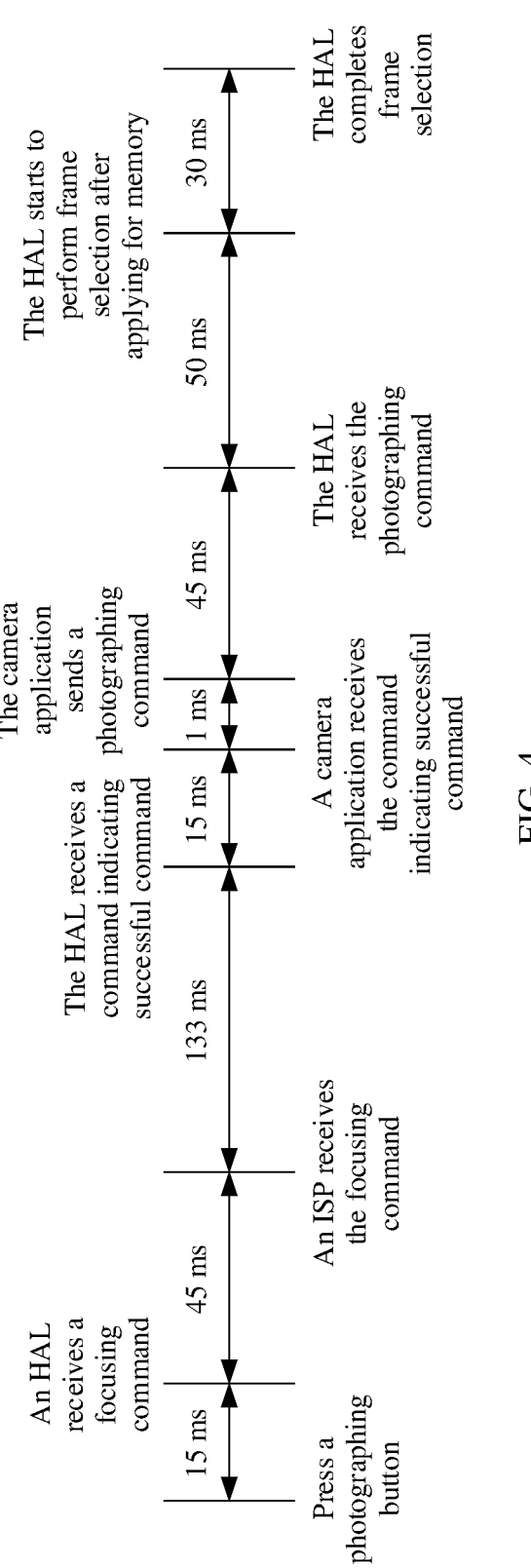
FIG. 4 is a schematic diagram of time required by a photographing method.

FIG. 4 is a schematic diagram of time required by a photographing method. As shown in FIG. 4, after a user performs a photographing operation (for example, presses a photographing button), time required for an HAL to receive a focusing command sent by a camera application is about 15 ms. Time required for an ISP to receive the focusing command sent by the HAL is about 45 ms. Time required for the HAL to receive a command indicating successful focusing returned by the ISP is about 133 ms. Time required for the camera application to receive the command indicating successful focusing sent by the HAL is about 15 ms. Time required for the camera application to send a photographing command is about 1 ms. Time required for the HAL to receive the photographing command sent by the camera application is about 45 ms. Time required for the HAL to apply for memory is about 50 ms. Time required for the HAL to perform ZSL frame selection is about 30 ms. Therefore, time required by the photographing method is about (15+45+133+15+1+45+50+30)=334 ms. In the photographing method, because the ISP needs to spend a long time to perform a focusing operation, time required for photographing is greatly increased, and a photographing speed is affected.

It can be learned from the foregoing description that, although the zero shutter lag photographing method can reduce a photographing lag, a long time for performing the focusing operation is still required. As a result, a photographing speed is low, and a photographing requirement of the user cannot be met. In particular, a requirement corresponding to a case in which the user needs to quickly take snapshots cannot be met.

The following describes in detail the quick photographing method provided in embodiments of this application with reference to the accompanying drawings and specific application scenarios.

Figures 5, 6:
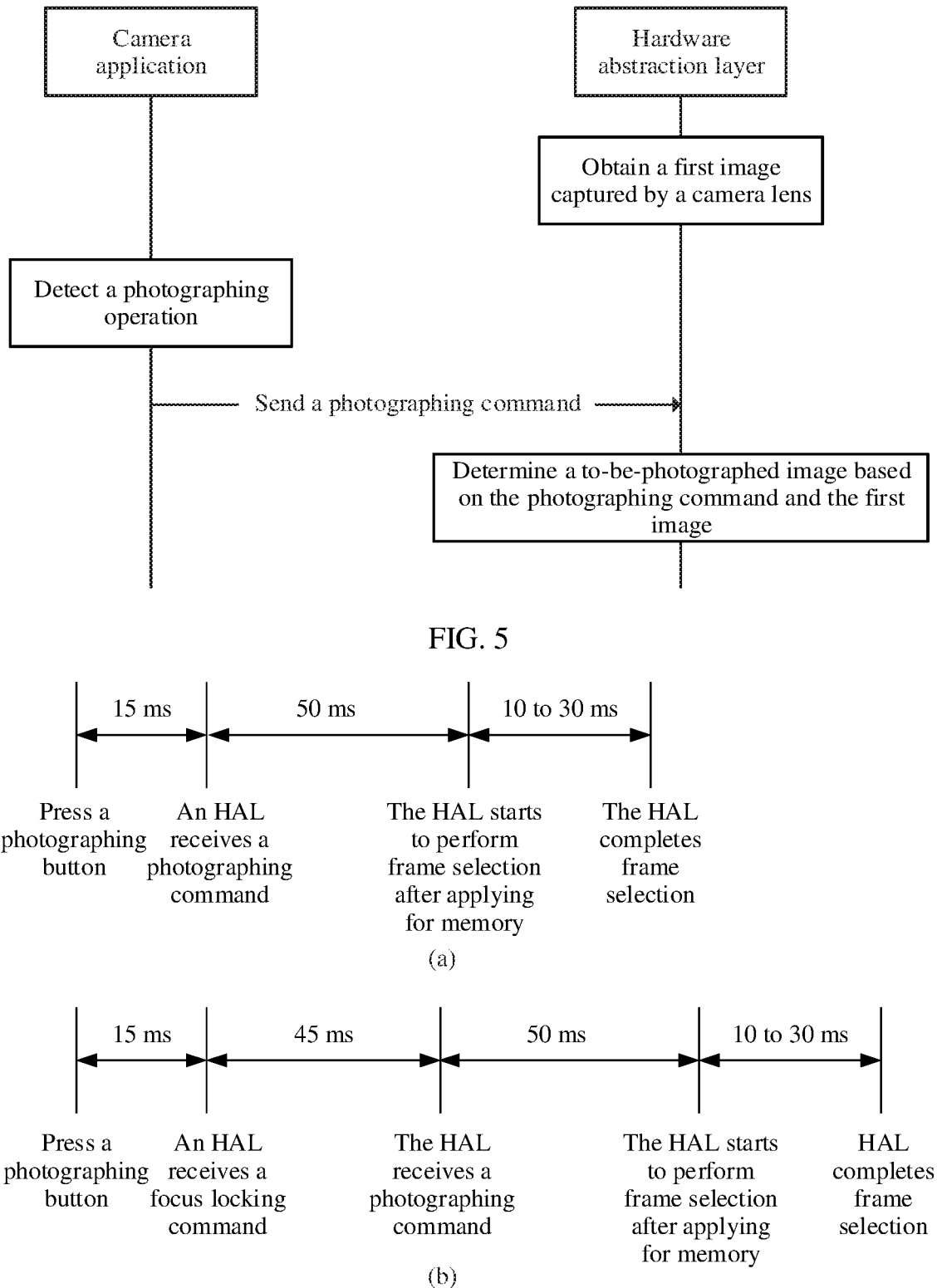
FIG. 5 is a schematic flowchart of a quick photographing method according to an embodiment of this application.
FIG. 6 is a schematic diagram of time required by a quick photographing method according to an embodiment of this application.

FIG. 5 is a schematic flowchart of a quick photographing method according to an embodiment of this application. As shown in FIG. 5, in this embodiment of this application, after a camera application is started, an HAL may start to obtain a first image captured by a camera lens. When the camera application detects a photographing operation, the camera application may directly send a photographing command to the HAL. After receiving the photographing command, the HAL may apply for memory, and determine a final to-be-photographed image based on the first image. To be specific, in this embodiment of this application, when the camera application detects the photographing operation, the camera application does not detect a current focusing status, and does not wait for the HAL to report a focusing completion state. That is, regardless of whether a current preview image is clear, the camera application directly sends the photographing command to the HAL, and the HAL may directly determine the final to-be-photographed image based on the photographing command and the first image, to effectively reduce focusing time in a photographing process, and improve a photographing speed. This can achieve an objective of quickly taking snapshots, and improves user experience.

In a possible implementation, before sending the photographing command to the HAL, the camera application may first send a focus locking command to the HAL. The HAL may perform focus locking based on the received focus locking command to end a focusing process, so that the camera lens may capture the stable and clear first image. This can improve image photographing effect. Specifically, after the camera application detects the photographing operation, the camera application may send the focus locking command to the HAL. After receiving the focus locking command, the HAL may perform a focus locking operation. In addition, after sending the focus locking command, the camera application may further send the photographing command to the HAL at an interval of preset time. After receiving the photographing command, the HAL may apply for the memory, and determine the final to-be-photographed image based on the first image. To be specific, in this embodiment of this application, when the camera application detects the photographing operation, the camera application does not detect a current focusing status, and does not wait for the HAL to report a focusing completion state. That is, regardless of whether a current preview image is clear, the camera application directly sends the focus locking command to the HAL to end a current focusing process, so that the camera lens may capture a stable and clear first image. Therefore, after the HAL receives the photographing command, the HAL may determine the final to-be-photographed image based on the photographing command and the stable and clear first image, to effectively reduce focusing time in a photographing process and improve a photographing speed on a basis of ensuring good photographing effect. This can achieve an objective of quickly taking snapshots, and improves user experience.

The preset time may be determined based on time required for the focus locking command to arrive at the HAL, time required for the photographing command to arrive at the HAL, and time required for the HAL to perform the focus locking operation. For example, the preset time is greater than or equal to (T1+T3−T2), where T1 is time required for the focus locking command to arrive at the HAL, T2 is time required for the photographing command to arrive at the HAL, and T3 is time required for the HAL to perform the focus locking operation.

FIG. 6 is a schematic diagram of time required by a quick photographing method according to an embodiment of this application. As shown in (a) in FIG. 6, in this embodiment of this application, after a user performs a photographing operation (for example, presses a photographing button), time required for the HAL to receive a photographing command sent by the camera application is about 15 ms. Time required for the HAL to apply for memory is about 50 ms. Time required for the HAL to determine to photograph an image is about 10 ms to 30 ms. Therefore, time required by the quick photographing procedure in this embodiment of this application is about 75 ms (that is, 15+50+10) to 95 ms (that is, 15+50+30).

Alternatively, as shown in (b) in FIG. 6, in this embodiment of this application, after a user performs a photographing operation (for example, presses a photographing button), time required for the HAL to receive a focus locking command sent by the camera application is about 15 ms. Time required for the HAL to perform a focus locking operation and receive the photographing command is about 45 ms. Time required for the HAL to apply for memory is about 50 ms. Time required for the HAL to determine to photograph an image is about 10 ms to 30 ms. Therefore, time required by the quick photographing procedure in this embodiment of this application is about 120 ms (that is, 15+45+50+10) to 140 ms (that is, 15+45+50+30). That is, time required by the quick photographing method provided in this embodiment of this application is far less than 334 ms required by the foregoing photographing method. This greatly improves a speed of quick photographing, and reduces time required for photographing.

In this embodiment of this application, the photographing command sent by the camera application to the HAL may include a first moment, or the focus locking command sent by the camera to the HAL may include a first moment, and the first moment may be a moment at which the camera application detects the photographing operation. When receiving the photographing command, the HAL may determine a second moment at which the HAL receives the photographing command. Therefore, after receiving the photographing command, the HAL may determine a preset image queue based on the first moment, the second moment, and the first image, determine a target image with high definition in the preset image queue, and determine a final to-be-photographed image based on the target image.

The following describes in detail a process in which the HAL determines the preset image queue based on the first moment, the second moment, and the first image.

In an example, the HAL may obtain, from the first images captured by the camera lens, R second images located between the first moment and the second moment, and may determine all the R second images as images in the preset image queue, where R≥1. That is, the preset image queue may include first images captured by the camera lens in a period of time from the first moment at which the camera application detects the photographing operation to the second moment at which the HAL receives the photographing command. For example, when the camera application detects the photographing operation at a moment T1, and the HAL receives, at a moment T2, the photographing command sent by the camera application, a preset image sequence may include first images captured by the camera lens in a period of time from T1 to T2. It may be understood that a frequency at which the camera lens captures an image may be specifically determined based on an actual situation. This is not specifically limited in this embodiment of this application.

In another example, after obtaining the R second images between the first moment and the second moment, the HAL may determine definition of the second image, and may determine the preset image sequence based on the definition of the second image. To be specific, it is ensured that all images in the preset image sequence are images with high definition, so that when a target image is subsequently determined from the preset image sequence, a quantity of images to be compared can be reduced, and a speed of determining the target image can be increased. This can improve a photographing speed.

In image processing, it is generally considered that, compared with an image with blurred focusing, an image with clear focusing has a sharper edge, that is, has a larger gradient. That is, a higher gradient of the image indicates higher definition of the image, and a lower gradient of the image indicates lower definition of the image. Therefore, in this embodiment of this application, the electronic device can determine the definition of the second image based on a gradient of the second image. Specifically, the electronic device may determine the definition of the second image based on a Tenengrad gradient method, or may determine the definition of the second image based on a Laplacian gradient method.

In the Tenengrad gradient method, a gradient of an image in a horizontal direction and a gradient of the image in a vertical direction are separately calculated by using a Sobel (Sobel) operator, then an average gradient of the image is calculated based on the gradient in the horizontal direction and the gradient in the vertical direction, and definition of the image is determined based on the average gradient of the image. For example, the average gradient of the image may be directly determined as the definition of the image; or a correspondence between average gradient and definition may be preset, and then the definition of the image may be determined based on the average gradient of the image and the correspondence.

The Laplacian gradient method is similar to the Tenengrad gradient method. The definition of an image is determined by calculating the gradient of the image. In the Laplacian gradient method, a Sobel operator is replaced with a Laplacian (Laplacian) operator to calculate a gradient.

In probability theory, a variance is a measure used to measure a degree of dispersion between a group of discrete data and expectation (for example, an average value of the group of data) of the group of discrete data. A larger variance indicates a larger deviation between the group of data, and indicates that the group of data is more unbalanced, that is, some data is large, and some data is small. A smaller variance indicates a smaller deviation between the group of data, and indicates that the group of data is more evenly distributed, that is, sizes of all pieces of data are similar. It should be understood that, compared with an image with blurred focusing, an image with clear focusing has a larger grayscale difference, that is, has a larger grayscale variance (that is, a variance on a grayscale). In other words, a larger grayscale variance indicates higher definition of the image. Therefore, in this embodiment of this application, the electronic device can also determine the definition of the image by using the variance method. Specifically, the electronic device may calculate the grayscale variance of the image, and may determine the definition of the image based on the grayscale variance. For example, the grayscale variance may be directly determined as the definition of the image; or a correspondence between the grayscale variance and the definition may be preset, and then the definition of the image may be determined based on the grayscale variance of the image and the correspondence.

It should be noted that the foregoing determining the definition of the second image by using the Tenengrad gradient method, the Laplacian gradient method, or the variance method is only an example for explanation, and should not be construed as a limitation on this embodiment of this application. Certainly, in this embodiment of this application, another method may be used to determine the definition of the second image. It should be understood that a specific method used to determine the definition of the second image may be specifically determined by skilled persons based on an actual situation.

In a possible implementation, the HAL may determine the preset image sequence based on the definition of the second image and a preset definition threshold. Specifically, after determining the definition of the second image, the HAL may obtain a third image whose definition is greater than the preset definition threshold, that is, obtain, from the second image, the image whose definition is greater than the preset definition threshold, as the image in the preset image queue. A quantity S of third images is greater than or equal to 1. The preset definition threshold may be specifically set by skilled persons based on an actual situation, or may be set by the electronic device by default. For example, the HAL may set the preset definition threshold by default based on the definition of the second image. For example, after determining the definition of the second image, the HAL may calculate average definition of the second image based on the definition of the second image, and may set the average definition to the preset definition threshold by default. For example, after determining the definition of the second image, the HAL may determine a moment at which the HAL completes the focus locking operation, and may set definition of the second image corresponding to the moment to the preset definition threshold by default.

In another possible implementation, after determining the definition of the second image, the HAL may obtain N fourth images with highest definition, and may determine the N fourth images as the images in the preset image sequence. N is an integer greater than or equal to 1, and a specific value of N may be specifically set by skilled persons based on an actual situation, or may be set by the HAL by default. For example, the HAL may set N by default based on the quantity R of second images, where N≤R. For example, when the quantity R of the second images is 3, the HAL may set N to 3 by default. To be specific, after obtaining three second images captured by the camera lens, the HAL may directly determine all the three second images as images in the preset image queue without determining definition of the three second images. For example, when the quantity R of the second images is 7, the HAL may set N to 4 by default. To be specific, after obtaining the seven second images captured by the camera lens, the electronic device may separately determine definition of the seven second images, and may sort the seven second images in descending order based on the definition of the second images. That is, a second image with higher definition is arranged closer to the front, and a second image with lower definition is arranged closer to the behind. Then, the HAL may select four second images that are arranged in the front as images in the preset image sequence. It is assumed that in the seven second images, definition of the second image A<definition of the second image C<definition of the second image E<definition of the second image B<definition of the second image F<definition of the second image D<definition of the second image G. After the seven second images are sorted in descending order, {the second image G, the second image D, the second image F, the second image B, the second image E, the second image C, the second image A} may be obtained, the HAL may determine {the second image G, the second image D, the second image F, the second image B} as images in the preset image sequence.

In still another example, before completing the focus locking operation, the electronic device generally performs autofocus. In an autofocus process, the electronic device may push an ophthalmic lens by starting a motor. However, it usually takes a period of time for the motor to start to reach a stable state. In the period of time, the unstable movement of the motor causes a poor focusing status, resulting in a blurred image captured by the camera lens. Therefore, in this embodiment of this application, the electronic device can obtain a third moment at which the motor is started and a fourth moment at which the motor is in the stable state. After obtaining the R second images captured by the camera lens, the HAL may determine a fifth image located between the third moment and the fourth moment, that is, determine which images in the second images are captured between the third moment and the fourth moment by the camera lens. Then, the HAL may obtain an image other than the fifth image in the second image, and may determine the second image other than the fifth image as an image in the preset image sequence. For example, when the second images obtained by the HAL include {the second image A, the second image B, the second image C, the second image D, the second image E, the second image F, and the second image G}, and the HAL determines that the fifth images obtained between the third moment and the fourth moment include {the second image C, the second image D}, the HAL may determine that the images in the preset image sequence include {the second image A, the second image B, the second image E, the second image F, the second image G}.

In this embodiment of this application, the HAL can alternatively remove the fifth image based on the third image or the fourth image, to obtain the preset image sequence. That is, after determining the third image or the fourth image based on the definition of the second image, the HAL may determine the fifth image located between the third moment and the fourth moment, that is, determine which images in the third image or the fourth image are captured between the third moment and the fourth moment by the camera lens. Then, the HAL may determine an image other than the fifth image in the third image or the fourth image as an image in the preset image sequence, to ensure definition of the image in the preset image sequence, improve a speed of determining the target image, and improve a photographing speed.

The following describes in detail a process in which HAL determines the target image in the preset image queue and determines the to-be-photographed image based on the target image.

In this embodiment of this application, the target image may be M images with highest definition in the preset image sequence. Alternatively, the target image may be M images with the highest definition that are closest to the first moment and that are in the preset image queue. The first moment is an actual photographing moment, namely, a moment at which the user triggers photographing, to reduce a photographing delay and improve photographing effect. M is an integer greater than or equal to 1, and a specific value of M may be set by skilled persons based on an actual situation, or may be set by the electronic device by default. For example, the electronic device may set M by default based on current ambient luminance. For example, when the current ambient luminance is medium and high luminance, the electronic device may set M to 1 by default. When the current ambient luminance is low luminance, the electronic device may set M to any value greater than 2 by default. It should be understood that the low luminance and the medium and high luminance may be determined based on a preset luminance threshold. That is, when the ambient luminance is less than or equal to the preset luminance threshold, it may be determined that the ambient luminance is low luminance; or when the ambient luminance is greater than the preset luminance threshold, it may be determined that the ambient luminance is medium and high luminance. The preset luminance threshold may be specifically determined by skilled persons based on an actual situation. For example, the preset luminance threshold may be set to 35 Candela/$m^2$ (lv), that is, low luminance means that luminance $\leq$35 lv, and medium and high luminance means that luminance >35 lv.

In an example, the HAL may directly determine any target image as the final to-be-photographed image. For example, when M is 1, that is, when there is only one target image, the HAL may directly determine the target image as the final to-be-photographed image. For example, when M is greater than or equal to 2, that is, when there are a plurality of target images, if the M target images have same definition, the HAL may directly determine any target image as the final to-be-photographed image; or if the M target images have different definition, the HAL may determine a target image with highest definition as the final to-be-photographed image.

In another example, when M is greater than or equal to 2, the HAL may perform synthesis processing on the M target images, and determine a synthesized image as the final to-be-photographed image. For example, the HAL may perform multi-frame noise reduction on the M target images, that is, the HAL may find, in different target images, a pixel with noise, and then perform weighted synthesis to replace the pixel with a pixel without noise at a same position in another target image, to obtain a clear and clean to-be-photographed image.

Specifically, after the camera application is started, the electronic device may obtain current ambient luminance, so that the HAL can determine the final to-be-photographed image based on the current ambient luminance and the target image. For example, when the current ambient luminance is low luminance, that is, when the current ambient luminance is less than or equal to 35 lv, the HAL may determine an image obtained after the M target images are synthesized as the final to-be-photographed image, that is, the HAL may obtain the M target images with highest definition in the preset image queue, and may perform multi-frame noise reduction on the M target images to obtain the final to-be-photographed image, to improve image photographing effect in a dark environment. When the current ambient luminance is medium and high luminance, that is, when the current ambient luminance is greater than 35 lv, the HAL may directly determine a single-frame target image as the final to-be-photographed image. That is, the HAL may obtain the M target images with highest definition in the preset image queue, and may determine one of the M target images as the final to-be-photographed image, to improve a photographing speed.

Figure 7:
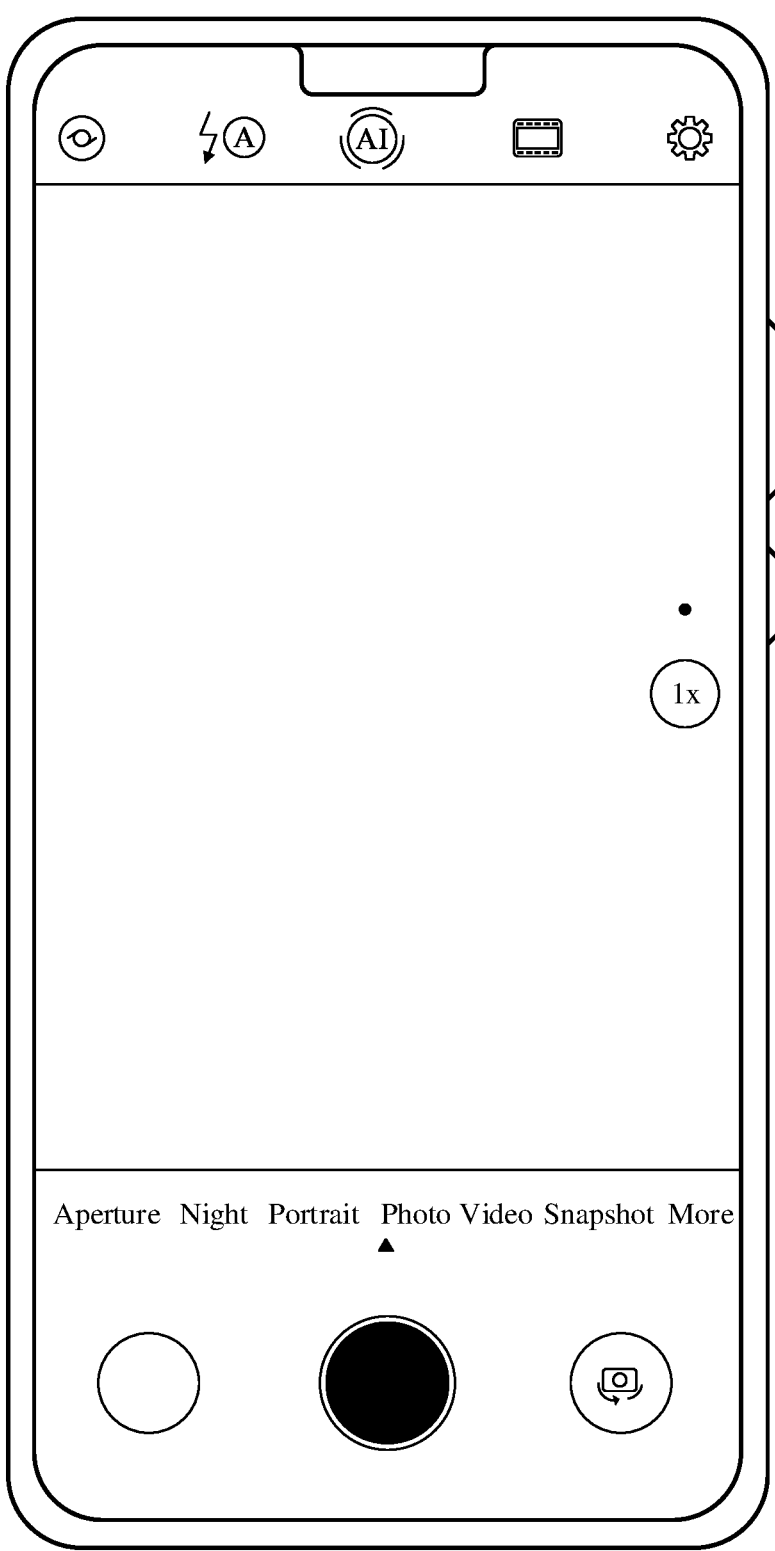
FIG. 7 is a schematic diagram 1 of an interface for a quick photographing method according to an embodiment of this application.

In a possible implementation, the quick photographing method provided in this embodiment of this application may be an optional mode (for example, a snapshot mode) of a camera application. A user may determine, based on an actual requirement, whether to enable the snapshot mode to perform photographing. FIG. 7 is a schematic diagram 1 of an interface for a quick photographing method according to an embodiment of this application. As shown in FIG. 7, after a user starts a camera application, modes such as an aperture mode, a portrait mode, a night mode, a photo mode, a video mode, and a snapshot mode may be displayed in a preview interface of the camera application for the user to select.

When the user selects the snapshot mode, an electronic device may perform photographing according to the quick photographing method provided in this embodiment of this application. When the user does not select the snapshot mode, the electronic device performs photographing according to a current common photographing method.

In another possible implementation, the quick photographing method provided in this embodiment of this application may alternatively be directly integrated into the photo mode of the camera application. To be specific, after the camera application is started, the electronic device may determine whether the camera application has a quick photographing function. If it is determined that the camera application has the quick photographing function, the electronic device may perform photographing according to the quick photographing method provided in this embodiment of this application. It should be understood that the quick photographing method provided in this embodiment of this application may alternatively be directly integrated into various modes of the camera application. To be specific, when the camera application has the quick photographing function, in the modes such as the aperture mode, the portrait mode, the night mode, the photo mode, and the video mode of the camera application, the electronic device may perform photographing according to the quick photographing method provided in this embodiment of this application.

In another possible implementation, the quick photographing method provided in this embodiment of this application may alternatively have a photographing function that is applicable only to a preset application scenario (for example, a snapshot scenario). Specifically, after the camera application is started, the electronic device may determine whether a current photographing scenario is a snapshot scenario. When determining that the current photographing scenario is the snapshot scenario, the electronic device may perform quick photographing according to the quick photographing method provided in this embodiment of this application, to meet a snapshot requirement of the user, and improve user experience; or when determining that the current photographing scenario is not the snapshot scenario, the electronic device may perform photographing based on the current common photographing method.

For example, the electronic device may determine, based on start time and a start manner of the camera application, whether the current photographing scenario is the snapshot scenario. Specifically, in a process in which the electronic device displays a first application, when detecting that the camera application is started by using a shortcut icon, the electronic device may determine that the current photographing scenario is the snapshot scenario. The first application is any application other than the camera application in the electronic device.

For example, in a process in which the electronic device displays an instant messaging application, if the user invokes a shortcut menu by sliding leftward, and starts the camera application by tapping a camera icon or a camera widget in the shortcut menu, the electronic device may determine that the current photographing scenario is the snapshot scenario. For example, in a process in which the electronic device displays an AI Life application, if the user starts the camera application by using a voice that includes a preset keyword or a preset gesture, the electronic device may determine that the current photographing scenario is the snapshot scenario.

For example, the electronic device may also directly determine, in a manner of starting the camera application, whether the current photographing scenario is the snapshot scenario. Specifically, a preset starting manner corresponding to the snapshot scenario may be preset in the electronic device. When starting the camera application, the electronic device may determine a current starting manner. If the current starting manner is the preset starting manner, the electronic device may determine that the current photographing scenario is the snapshot scenario.

For example, the electronic device may reset the preset starting manner as a voice starting manner including a "snapshot" keyword or a gesture starting manner of "pinch with five fingers". When starting the camera application, the electronic device may determine whether the camera application is started by the voice including the "snapshot" keyword or by the "pinch with five fingers" gesture. If it is determined that the camera application is started by the voice including the "capture" keyword or by the "pinch with five fingers" gesture, the electronic device may determine that the current photographing scenario is the snapshot scenario.

It should be noted that the foregoing determining, based on the start time and the start manner of the camera application, or directly based on the start manner of the camera application, whether the current photographing scenario is the preset application scenario is only an example for explanation, and should not be construed as a limitation on this embodiment of this application. In this embodiment of this application, whether the current photographing scenario is the preset application scenario may also be determined in another manner. A specific determining manner may be set by skilled persons based on an actual scenario.

In this embodiment of this application, when quick photographing is performed, the electronic device may disable an artificial intelligence (artificial intelligence, AI) algorithm in the camera application, to reduce occupation on resources such as a processor of the electronic device by performing the AI algorithm, and ensure that quick photographing can be effectively performed, improve a photographing speed, and improve user experience.

The following uses an example in which the electronic device is a mobile phone with a foldable display to describe the quick photographing method provided in embodiments of this application. A quick photographing function provided in the quick photographing method provided in this embodiment of this application may be directly integrated into a secondary display camera application of the mobile phone. That is, when the mobile phone is in a folded state, the user may perform quick photographing by using the secondary display camera application of the mobile phone.

Figure 8:
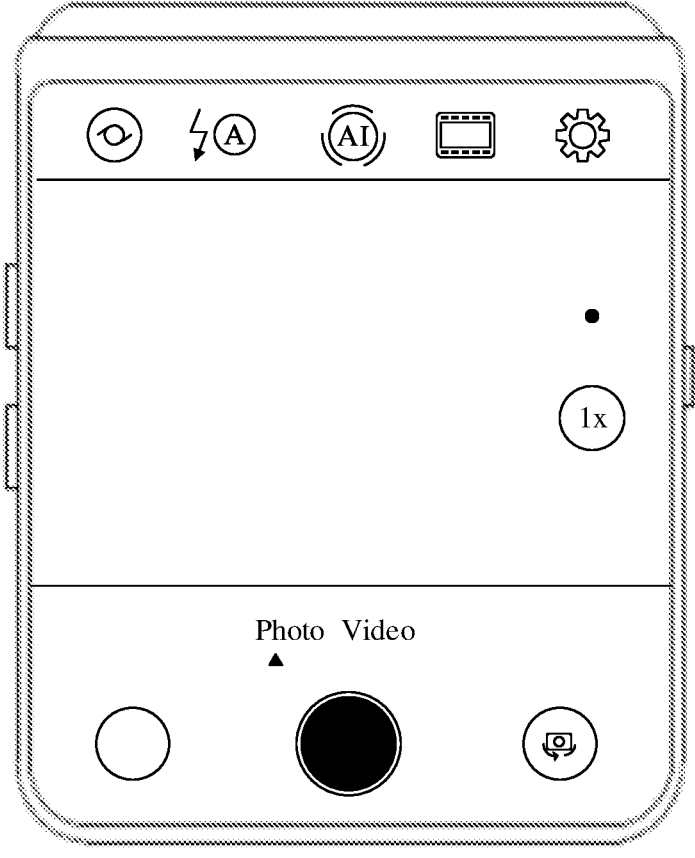
FIG. 8 is a schematic diagram 2 of an interface for a quick photographing method according to an embodiment of this application.

FIG. 8 is a schematic diagram 2 of an interface for a quick photographing method according to an embodiment of this application. Specifically, when a mobile phone is in a folded state, a user may invoke an icon or a widget of a secondary display camera application by sliding leftward or sliding rightward on an interface of the secondary display. Then, the user may tap or touch the icon or the widget to start the secondary display camera application. After the secondary display camera application is started, an HAL may obtain a first image captured by a camera lens. In addition, as shown in FIG. 8, the secondary display camera application may display a preview image on the interface of the secondary display, and the preview interface may display a mode such as a photo mode or a video mode. After detecting the photographing operation, the secondary display camera application may directly send a focus locking command to the HAL. After receiving the focus locking command, the HAL may perform a focus locking operation. Then, the secondary display camera application may send a photographing command to the HAL, where the photographing command may include a first moment, and the first moment is a moment at which the secondary display camera application detects the photographing operation. After receiving the photographing command, the HAL may obtain a second moment at which the HAL receives the photographing command, determine a preset image sequence based on the first moment, the second moment, and the first image, and apply for memory. In addition, after the secondary display camera application is started, the mobile phone may further detect current ambient luminance by using an ambient light sensor, and may set a quantity M of target images by default based on the current ambient luminance. Assuming that the current ambient luminance is 56 lv, the mobile phone may determine that the current ambient luminance is medium and high luminance. In this case, the mobile phone may set M to 1 by default. Then, the HAL may determine an image with highest definition in the preset image queue as a target image, and may determine the target image as a final to-be-photographed image, to store the target image in the applied memory. Assuming that the current ambient luminance is 23 lv, the mobile phone may determine that the current ambient luminance is low luminance. In this case, the mobile phone may set M to 4 by default. Then, the HAL may determine four images with highest definition in the preset image queue as target images, and may perform multi-frame noise reduction on the four target images, to determine an image obtained by the multi-frame noise reduction as a final to-be-photographed image, and store the final to-be-photographed image in the applied memory.

Subsequently, the user may view the to-be-photographed image from the Gallery, or may tap a thumbnail of the secondary display camera application to view the to-be-photographed image.

It should be understood that sequence numbers of the steps do not mean execution sequences in the foregoing embodiments. The execution sequences of the processes should be determined based on functions and internal logic of the processes, and should not be construed as any limitation on the implementation processes of embodiments of this application.

Corresponding to the quick photographing method described in the foregoing embodiment, an embodiment of this application further provides a quick photographing apparatus. Modules of the apparatus may correspondingly implement steps of the quick photographing method.

It should be noted that content such as information exchange between the foregoing apparatuses/units and the execution processes thereof is based on a same concept as the method embodiments of this application. For specific functions and technical effect of the content, refer to the method embodiments. Details are not described herein again.

Persons skilled in the art may clearly understand that, for the purpose of convenient and brief description, division into the foregoing functional units or modules is only used as an example for illustration. During actual application, the foregoing functions may be allocated to different functional units or modules for implementation based on a requirement, that is, an inner structure of an apparatus is divided into different functional units or modules to implement all or some of the functions described above. Functional units and modules in embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are only for ease of distinguishing between the functional units and modules, but are not intended to limit the protection scope of this application. For a specific working process of the units or modules in the foregoing system, refer to a corresponding process in the foregoing method embodiments. Details are not described herein again.

An embodiment of this application further provides an electronic device. The electronic device includes at least one memory, at least one processor, and a computer program that is stored in the at least one memory and that can be run on the at least one processor. When the computer program is executed by the processor, the electronic device is enabled to implement the steps in any one of the foregoing method embodiments. For example, a structure of the electronic device may be shown in FIG. 1.

An embodiment of this application further provides a computer-readable storage medium. The computer-readable storage medium stores a computer program. When the computer program is executed by a computer, the computer is enabled to implement the steps in any one of the foregoing method embodiments.

An embodiment of this application provides a computer program product. When the computer program product runs on an electronic device, the electronic device is enabled to implement the steps in any one of the foregoing method embodiments.

When the integrated unit is implemented in the form of the software functional unit and sold or used as an independent product, the integrated unit may be stored in a computer-readable storage medium. Based on such an understanding, all or some of the procedures of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable storage medium may include at least any entity or apparatus that can carry computer program code to an apparatus/electronic device, a recording medium, a computer memory, a read-only memory (ROM), a random access memory (RAM), an electrical carrier signal, a telecommunication signal, and a software distribution medium, for example, a USB flash drive, a removable hard disk, a magnetic disk, or an optical disk. In some jurisdictions, the computer-readable storage medium cannot be the electrical carrier signal or the telecommunication signal according to legislation and patent practices.

In the foregoing embodiments, the description of each embodiment has a focus. For a part that is not described in detail or recorded in an embodiment, refer to related descriptions in other embodiments.

Persons of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

In embodiments provided in this application, it should be understood that the disclosed apparatus/electronic device and method may be implemented in other manners. For example, the described apparatus/electronic device embodiment is only an example. For example, division into the modules or units is only logical function division and may be other division in an actual implementation. For example, a plurality of units or assemblies may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of embodiments.

The foregoing embodiments are only intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. A photographing method comprising:
    sending, by a camera application of an electronic device comprising a camera lens, a focus locking command to a hardware abstraction layer of the electronic device;
    performing, by the hardware abstraction layer, a focus locking operation in response to the focus locking command;
    sending, by the camera application, a photographing command to the hardware abstraction layer in response to a photographing operation; and
    determining, by the hardware abstraction layer based on a first image, a to-be-photographed image in response to the photographing command, wherein the first image is an image that is captured by the camera lens and that is obtained by the hardware abstraction layer after the camera application is started.

2. The method according to claim 1,
    wherein the photographing command comprises a first moment, and the first moment is a moment at which the camera application detects the photographing operation; and
    wherein determining the to-be-photographed image comprises:
        determining, by the hardware abstraction layer, a second moment, and determining a preset image queue based on the first moment, the second moment, and the first image, wherein the second moment is a moment at which the hardware abstraction layer receives the photographing command; and

determining, by the hardware abstraction layer, the to-be-photographed image based on the preset image queue.

3. The method according to claim 2, wherein determining the preset image queue comprises:
    determining, by the hardware abstraction layer, a second image that is in the first image and that is located between the first moment and the second moment, wherein the second image is at least one of the first images; and
    determining, by the hardware abstraction layer, the second image as an image in the preset image queue.

4. The method according to claim 2, wherein determining the preset image queue comprises:
    determining, by the hardware abstraction layer, a second image that is in the first image and that is located between the first moment and the second moment, wherein the second image is at least one of the first images; and
    obtaining, by the hardware abstraction layer, definition of the second image, and determining the preset image queue based on the definition of the second image.

5. The method according to claim 4, wherein determining the preset image queue based on the definition of the second image comprises:
    obtaining, by the hardware abstraction layer, a third image whose definition is greater than a preset definition threshold, and determining the third image as an image in the preset image queue, wherein the third image is at least one of the second images.

6. The method according to claim 4, wherein determining the preset image queue based on the definition of the second image comprises:
    obtaining, by the hardware abstraction layer, N fourth images with highest definition from the second images, and determining the N fourth images as images in the preset image queue, wherein $N \geq 1$.

7. The method according to claim 2, wherein determining the preset image queue comprises:
    determining, by the hardware abstraction layer, a second image that is in the first image and that is located between the first moment and the second moment, wherein the second image is at least one of the first images;
    obtaining, by the hardware abstraction layer, a third moment at which a motor is started and a fourth moment at which the motor is in a stable state;
    obtaining, by the hardware abstraction layer, a fifth image that is in the second image and that is located between the third moment and the fourth moment; and
    determining, by the hardware abstraction layer, the preset image queue based on the second image and the fifth image.

8. The method according to claim 2, wherein the determining the to-be-photographed image based on the preset image queue comprises:
    obtaining, by the hardware abstraction layer, a target image with highest definition in the preset image queue, and determining the target image as the to-be-photographed image.

9. The method according to claim 2, wherein the determining the to-be-photographed image based on the preset image queue comprises:
    obtaining, by the hardware abstraction layer, a target image with the highest definition that is closest to the first moment and that is in the preset image queue, and
determining the target image as the to-be-photographed
image.

10. The method according to claim 2, wherein determining the to-be-photographed image based on the preset image queue comprises:
obtaining, by the hardware abstraction layer, M target images with highest definition in the preset image queue, wherein M>1; and
performing, by the hardware abstraction layer, synthesis processing on the M target images, and determining a synthesized image as the to-be-photographed image.

11. The method according to claim 2, wherein determining the to-be-photographed image based on the preset image queue comprises:
obtaining, by the hardware abstraction layer, M target images with the highest definition that are closest to the first moment and that are in the preset image queue; and
performing, by the hardware abstraction layer, synthesis processing on the M target images, and determining a synthesized image as the to-be-photographed image.

12. The method according to claim 2, wherein determining the to-be-photographed image based on the preset image queue comprises:
obtaining, by the hardware abstraction layer, current ambient luminance, and determining the to-be-photographed image based on the ambient luminance and the preset image queue.

13. The method according to claim 12, wherein determining the to-be-photographed image based on the ambient luminance and the preset image queue comprises:
when the ambient luminance is greater than a preset luminance threshold, obtaining, by the hardware abstraction layer, a target image with highest definition in the preset image queue, and determining the target image as the to-be-photographed image.

14. The method according to claim 12, wherein determining the to-be-photographed image based on the ambient luminance and the preset image queue comprises:
when the ambient luminance is less than or equal to the preset luminance threshold, obtaining, by the hardware abstraction layer, M target images with highest definition in the preset image queue, wherein M>1; and
performing, by the hardware abstraction layer, synthesis processing on the M target images, and determining a synthesized image as the to-be-photographed image.

15. An electronic device comprising:
one or more processors; and
a non-transitory computer readable medium which contains computer-executable instructions, the one or more processors being configured to execute the computer-executable instructions to enable the electronic device to perform operations comprising:
sending, by a camera application of the electronic device, a focus locking command to a hardware abstraction layer of the electronic device;
performing, by the hardware abstraction layer, a focus locking operation in response to the focus locking command;
sending, by the camera application, a photographing command to the hardware abstraction layer in response to a photographing operation; and
determining, by the hardware abstraction layer based on a first image, a to-be-photographed image in response to the photographing command, wherein the first image is an image that is captured by a camera lens of the electronic device and that is obtained by the hardware abstraction layer after the camera application is started.

16. The electronic device according to claim 15,
wherein the photographing command comprises a first moment, and the first moment is a moment at which the camera application detects the photographing operation; and
wherein the operations for determining the to-be-photographed image further comprises:
determining, by the hardware abstraction layer, a second moment, and determining a preset image queue based on the first moment, the second moment, and the first image, wherein the second moment is a moment at which the hardware abstraction layer receives the photographing command; and
determining, by the hardware abstraction layer, the to-be-photographed image based on the preset image queue.

17. The electronic device according to claim 16, wherein the operations for determining the preset image queue based on the first moment, the second moment, and the first image further comprises:
determining, by the hardware abstraction layer, a second image that is in the first image and that is located between the first moment and the second moment, wherein the second image is at least one of the first images; and
determining, by the hardware abstraction layer, the second image as an image in the preset image queue.

18. A non-transitory computer readable medium which contains computer-executable instructions, wherein the computer-executable instructions, when executed by a processor, enables an electronic device to perform operations comprising:
sending, by a camera application of an electronic device, a focus locking command to a hardware abstraction layer of the electronic device;
performing, by the hardware abstraction layer, a focus locking operation in response to the focus locking command;
sending, by the camera application, a photographing command to the hardware abstraction layer in response to a photographing operation; and
determining, by the hardware abstraction layer based on a first image, a to-be-photographed image in response to the photographing command, wherein the first image is an image that is captured by a camera lens of the electronic device and that is obtained by the hardware abstraction layer after the camera application is started.

19. The non-transitory computer readable medium according to claim 18, wherein the photographing command comprises a first moment, and the first moment is a moment at which the camera application detects the photographing operation; and
wherein determining the to-be-photographed image comprises:
determining, by the hardware abstraction layer, a second moment, and determining a preset image queue based on the first moment, the second moment, and the first image, wherein the second moment is a moment at which the hardware abstraction layer receives the photographing command; and
determining, by the hardware abstraction layer, the to-be-photographed image based on the preset image queue.

20. The non-transitory computer readable medium according to claim 19, wherein determining the preset image queue comprises:

determining, by the hardware abstraction layer, a second image that is in the first image and that is located between the first moment and the second moment, wherein the second image is at least one of the first images; and determining, by the hardware abstraction layer, the second image as an image in the preset image queue.

* * * * *